United States Patent [19]
Erickson et al.

[11] Patent Number: 5,125,362
[45] Date of Patent: Jun. 30, 1992

[54] TURKEY NEST TIMER

[75] Inventors: Richard G. Erickson, Thief River Falls; George O. Erickson, Viking; Donald E. Vanek, Plummer, all of Minn.

[73] Assignee: Erickson Automation, a partnership, Thief River Falls, Minn.

[21] Appl. No.: 625,304

[22] Filed: Dec. 10, 1990

[51] Int. Cl.⁵ .............................................. A01K 31/00
[52] U.S. Cl. .................................................... 119/45.1
[58] Field of Search ................ 119/163, 45.1, 47, 48, 119/50.5

[56] References Cited

U.S. PATENT DOCUMENTS

| | | | |
|---|---|---|---|
| 2,692,578 | 10/1954 | Manning | 119/48 |
| 2,811,944 | 11/1957 | Tirrill et al. | 119/45.1 |
| 3,139,065 | 6/1964 | Willauer, Jr. | 119/50.5 X |
| 3,242,904 | 3/1966 | Rannou | 119/48 |
| 3,734,057 | 5/1973 | Lee et al. | 119/163 |
| 4,188,911 | 2/1980 | Rafaely | 119/48 |
| 4,729,342 | 3/1988 | Loctin | 119/163 |
| 4,748,700 | 6/1988 | Wooten | 119/163 X |

FOREIGN PATENT DOCUMENTS 2616622 6/1987 France.

Primary Examiner—Gene Mancene
Assistant Examiner—Thomas Price
Attorney, Agent, or Firm—Kinney & Lange

[57] ABSTRACT

A nesting assembly for encouraging domestic fowl egg production is described. The assembly includes a fowl contact plate mounted to a support member and supported over a trough. The plate comprises a plate upper surface with a depression thereon forming a nesting basin. The nesting basin includes a basin lower surface sloping rearwardly to an aperture in a basin rear wall. The aperture accepts eggs laid by a nesting hen. The nesting assembly further comprises an indicator. The indicator indicates presence and duration of the fowl on the nesting assembly.

21 Claims, 3 Drawing Sheets

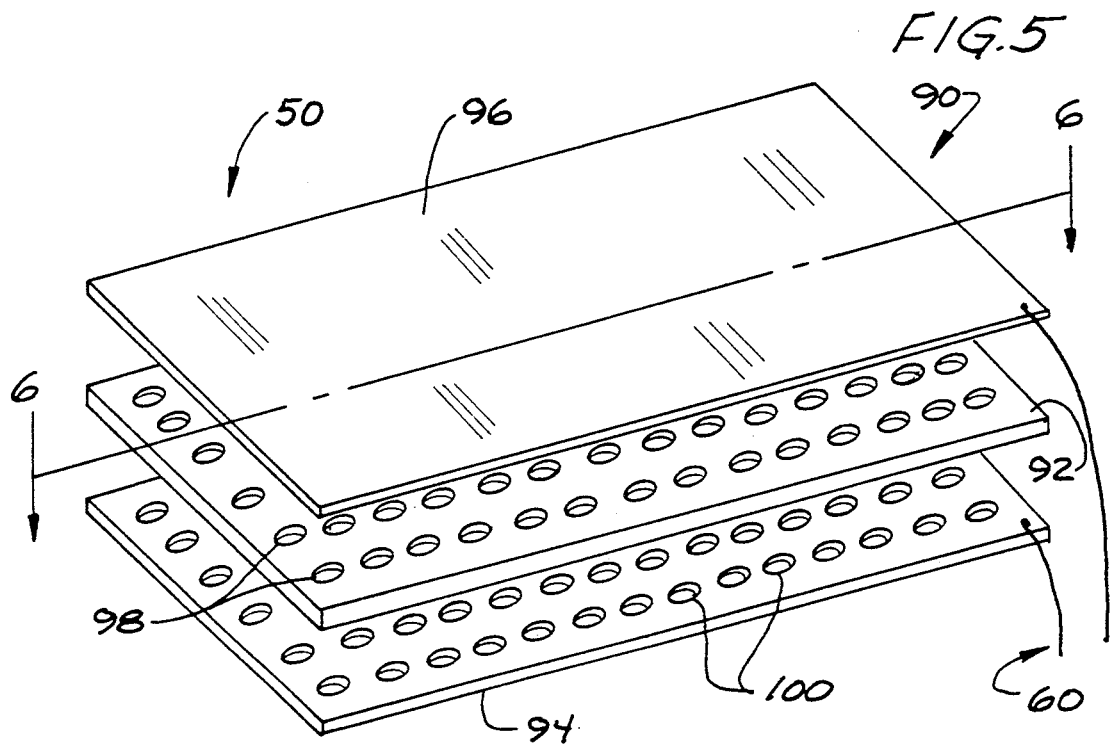
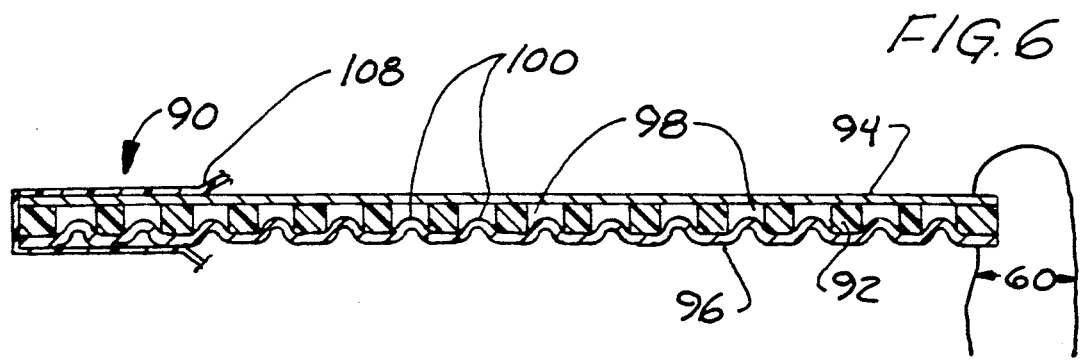

TURKEY NEST TIMER

BACKGROUND OF THE INVENTION

The present invention relates to a nest assembly for encouraging egg production by domestic fowl and, more particularly, to a nest assembly that provides an improved nest basin with indicators and a timer to determine the duration a hen remains on the nest.

Domestic egg production farms, such as turkey farms, provide large banks of individual nesting assemblies in which a hen can lay an egg. After the hen has entered the nest and has laid the egg, the hen may tend to remain sitting on the egg and become what is commonly referred to as "broody". A broody hen will want to remain on the nest to hatch eggs and will no longer produce eggs.

In order to delay hens from becoming broody, an operator can remove the hens from the nesting assemblies if they remain too long. Some attempts have been made to provide ejectors for the hen to eject the hen from the nest after a time period, but these are generally unsatisfactory. Proper flock management requires that the operator know the status of each nesting assembly in order to keep the nests available for hens that are laying eggs. Specifically, the operator must know when a hen is present on a particular nesting assembly and, more importantly, the amount of time the hen has remained on that nesting assembly. Given the large number of nesting assemblies used on the farms and the large number of hens in most flocks, it is impossible to manage by periodic visual checking of the nests.

There is a need for an improved nesting assembly, which indicates entry and presence of a hen and which indicates when the hen remains on the nesting assembly more than a set time. Such nesting assembly should provide the desired features without discouraging hens from entering the nesting assembly or complicating the task of gathering eggs.

SUMMARY OF THE INVENTION

The present invention relates to a nesting assembly, which provides an indication of hen occupancy time to indicate hens which should be removed from a nest and for encouraging domestic fowl egg production. The nesting assembly comprises a support member, and a support plate mounted to the support member. The support plate has an upper surface with a depression formed thereon to serve as a nesting basin. The nesting basin is oval in shape with inwardly inclined basin side walls.

The nesting basin further includes an inclined lower basin wall, which slopes rearwardly to an egg discharge aperture located in a portion of the basin side wall. A conveyor or trough is provided beneath the aperture to receive and transport eggs exiting the nests to an egg collection location.

A weight sensor is mounted to the nesting assembly that detects presence of the hen from the weight of the hen. In one preferred embodiment, the sensor is a switch that mounts below the lower basin and surface. The sensor provides a signal representative of lower basin wall downward deflection from the weight of a hen. In an alternative embodiment, the deflection sensor comprises a pressure sensitive switch mat positioned on the lower basin surface. The mat is formed from upper and lower conductive plates with a compressible insulating material interposed between the conductive plates. The insulating material includes apertures which align with conductive dimples formed on one of the conductive plates. Presence of the hen is detected when the weight of the hen causes the upper conductive plate to deflect and compress the interposed insulating material allowing the dimples to project through the aperture in the insulating material and engage the lower conductive plate and make electrical contact. With electrical leads attached to both the upper and lower plates and current supplied from a suitable power supply, the mat functions as a switch.

In either embodiment, the sensor is coupled to an input of an indicating circuit. The indicating circuit comprises a visual indicator and a timer that are both initiated by the sensor used when there is sufficient hen weight. The timer has an adjustable preselected time duration and a "time elapsed" output coupled to a second indicator. The timer output controls the second indicator if the sensor does not provide indication that the hen has vacated the nesting assembly (a return to no-load condition) before the preselected time duration has expired. The construction disclosed provides a nest that can be used in existing nest assemblies so retrofit is not a problem. Flock management is enhanced because the production of hens is easily monitored and hens which want to brood and hatch eggs (that is, become "broody") can be identified and culled.

BRIEF DESCRIPTION OF THE DRAWINGS

FIG. 5 is an exploded perspective view of the pressure sensitive mat of FIG. 4; and FIG. 6 is a sectional view of the pressure sensitive mat taken along line 6—6 of FIG. 5.

DETAILED DESCRIPTION OF THE PREFERRED EMBODIMENTS

Figure 1:
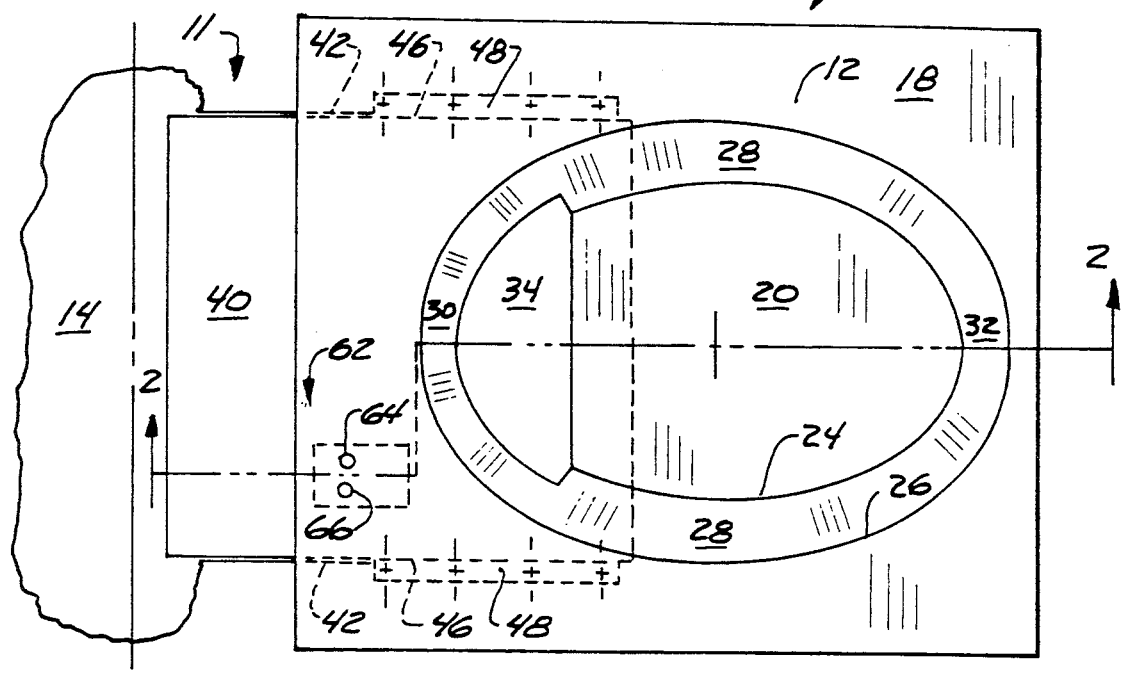
FIG. 1 is a top plan view of a nesting assembly constructed in accordance with the invention.
Figure 2:
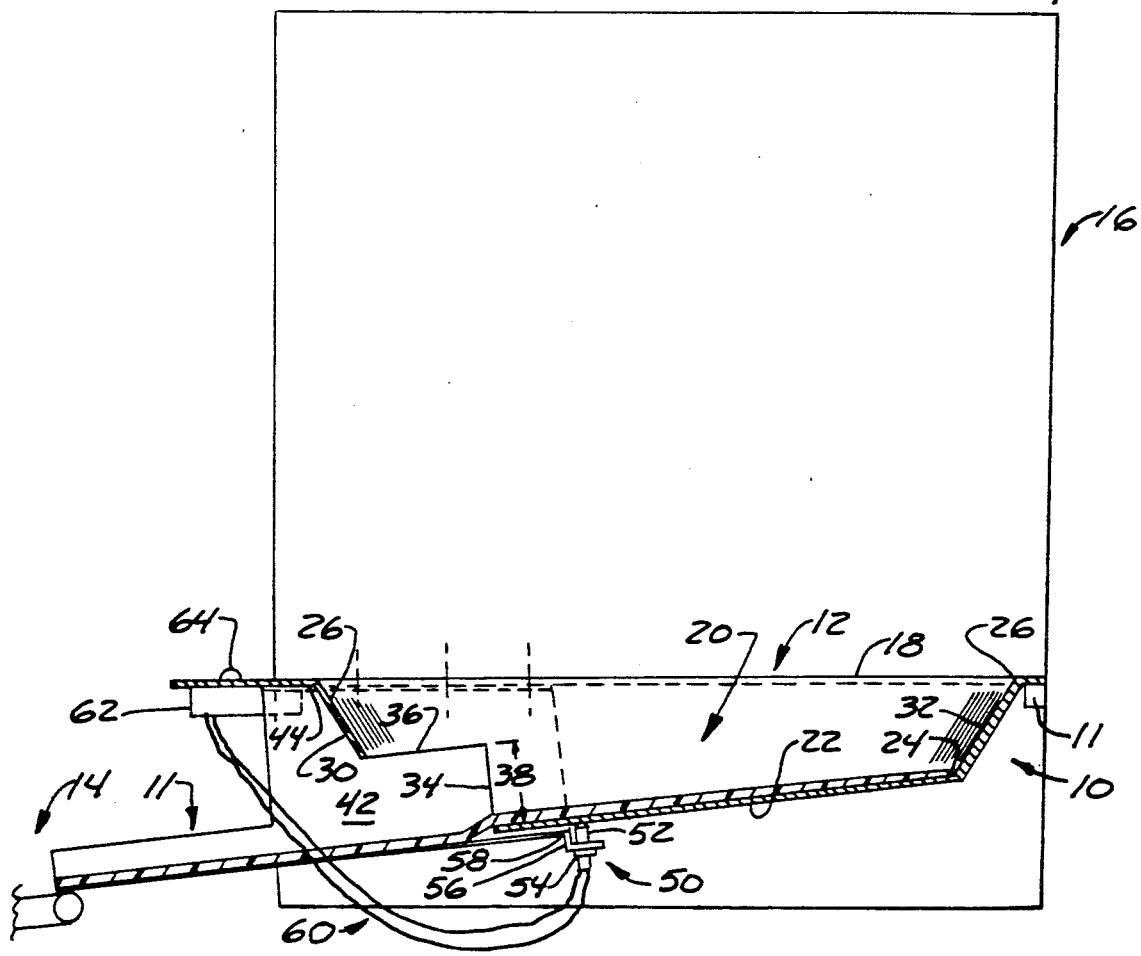
FIG. 2 is a sectional view of the nesting assembly of FIG. 1 taken along line 2—2 of FIG. 1.

In FIGS. 1 and 2, a nesting assembly 10 of the present invention is shown. Generally, nesting assembly 10 comprises a hen support plate 12 where a hen desiring to lay an egg is supported, and a chute or trough 11 that directs the egg from the nesting assembly 10 to an egg collection conveyor 14. As shown in FIG. 2, nesting assembly 10 is mounted to a support member 11 generally in a horizontal plane either in the open, or more commonly, within a nesting enclosure 16. When mounted in nesting enclosure 16, nesting assembly 10 provides a nest bottom. One side wall of a conventional nesting enclosure 16 is shown. Any desired or standard nesting enclosure can be used.

The hen support plate 12 has an upper edge surface 18 surrounding a nesting basin 20 which is an oval depression located substantially in the center of hen support plate 12. Nesting basin 20 has a natural nest shape for the hen that desires to lay an egg.

Nesting basin 20 includes a generally flat inclined lower basin wall 22 that slopes rearwardly. Lower basin wall 22 is centered generally on hen support plate 12. As shown in FIG. 2, a nesting basin 20 has a generally conical or tapered side wall 28 formed between a lower basin surface edge 24 and an upper basin surface edge 26, so the side wall 28 inclines inwardly toward the lower basin wall 22. Furthermore, since inner lower basin wall 22 slopes downwardly and rearwardly, portions of basin side wall 28 forming a rear basin wall portion 30 have an overall depth from upper surface 18 to lower basin wall 22 that is greater than those portions of basin side wall 28 forming a front basin wall portion 32.

An aperture 34 is located in basin rear wall portion 30. Aperture 34 is fairly large and allows eggs deposited in nesting basin 20 to travel under gravitational force to trough 11. An upper aperture edge 36 is formed on basin rear wall portion 30 at a height 38 from lower basin wall 22 to allow egg passage to trough 11. A removable mat 25 is provided to cover lower basin surface 22 and trough 11 to prevent the egg from breaking.

Trough 11 comprises a trough plate 40 and trough side panels 42. Trough 11 is positioned under hen support plate 12 such that aperture 34 overlies trough plate 40. Trough is either separately supported in this position or as shown in the preferred embodiment is mounted to a lower surface 44 of support plate 12 with mounting tabs 46 formed on upper edges 48 of trough side panels 42. The lower basin wall 22 is somewhat flexible and resilient, so when a hen sits on the nest the lower basin wall 22 deflects downwardly, and when the hen leaves, the wall 22 returns to an initial position.

To detect presence of a nesting hen on nesting assembly 10, a deflection sensor 50 is used. In one embodiment shown in FIG. 2, sensor 50 comprises an electrical switch 52 that is mounted to switch bracket 54. Switch bracket 54 is secured to a mounting tab 56 formed on a front edge 58 of trough 11 below the lower surface of lower wall 22. The switch 52 is mounted to a member which provides a reference position for detecting bottom wall 22. Hen presence is detected when the weight of the hen causes lower basin wall 22 to deflect downwardly and engage sensor 50. Switch 52 is electrically connected with wire leads 60 to an indicating unit 62 that has indicating lamps 64 and 66 mounted thereon.

Figure 4:
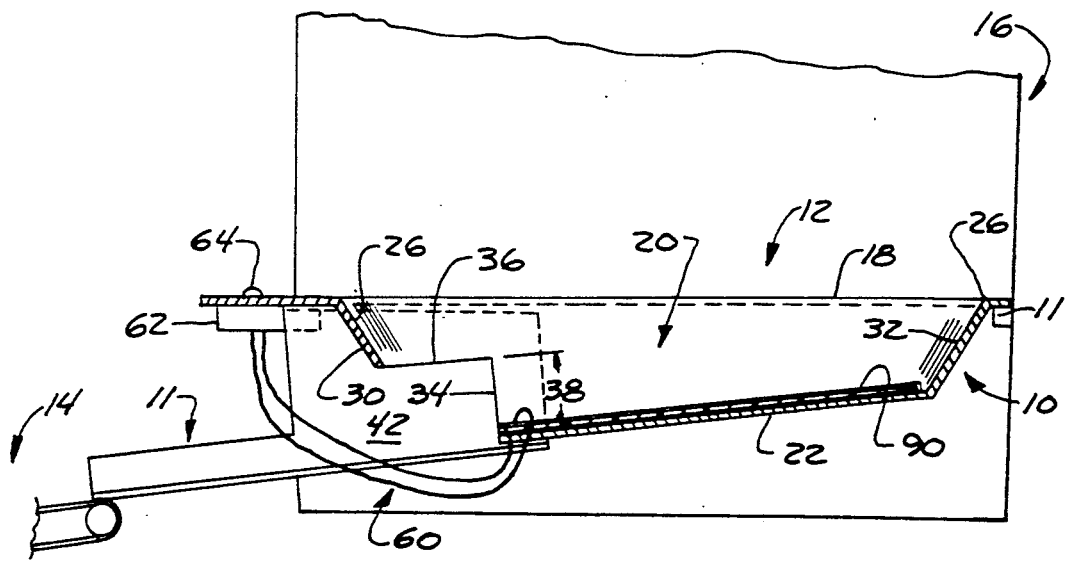
FIG. 4 is a sectional view of a nesting assembly with a pressure sensitive mat.

In an alternative embodiment shown in FIG. 4, sensor 50 comprises a pressure sensitive mat 90 that lies on top of lower basin wall 22. Mat 90, as shown in detail in FIGS. 5 and 6, comprises a non-conductive resilient and compressible sheet 92 interposed between two conductive plates 94 and 96. As shown in FIG. 5, sheet 92 has a plurality of through holes 98. Individual holes 98 align with corresponding conductive dimples 100 formed on conductive plate 94. The dimples extend partially through aligning one of the holes 98. In this embodiment, mat 90 detects hen presence when the weight of the hen causes smooth plate 96 to deflect downwardly and compress sheet 92. With sheet 92 compressed, the ends of conductive dimples 100 control plate 96 to form in effect the closing of an electrical switch represented by switch 52. Mat 90 is electrically connected to indicating unit 62 with leads 60A which are connected to the plates 94 and 96. The electrical connection formed by the ends of dimples 100 and plate 96 is opened when the hen vacates the nesting assembly and sheet 92 returns to an uncompressed state. Plates 94 and 96 can be formed from any conductive material such as 24 gauge galvanized metal with dimples 100 formed as depressions thereon. Sheet 92 can be formed from any suitable compressible material such as a soft resilient foamed plastic with non-conductive or insulating properties. The mat 90 may be enclosed within a sealed plastic envelope 108 to protect the components from getting dirty.

Figure 3:
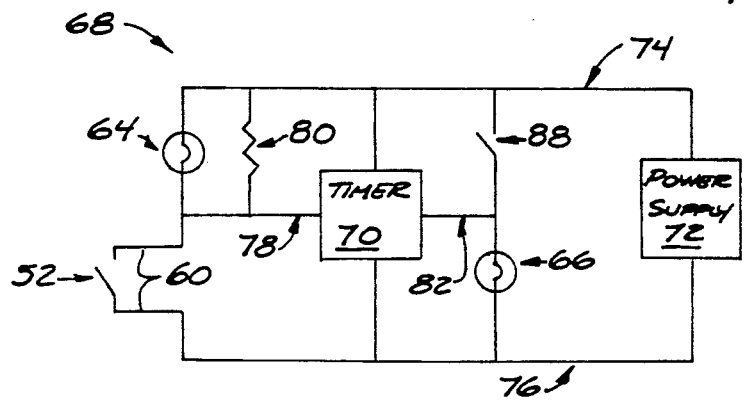
FIG. 3 is a combined block and schematic diagram of a timing circuit of the present invention.

An indicating circuit 68 for indicating unit 62 is shown in FIG. 3, and includes a power supply 72 supplying a positive voltage level to supply line 74 and a reference voltage level to supply line 76. Supply lines 74 and 76 provide power for a timer 70. Timer 70 has an adjustable preselected time delay which is initiated when an initiating voltage is provided to an input line 78 by closing the electrical connection of sensor 50. Indicator lamp 64 and a biasing resistor 80 are connected in parallel between supply line 74 and input line 78. Sensor 50 is connected with leads 60 between input line 78 and supply line 76. The indicator lamp 64 also is powered (lit) when the electrical connection of sensor 50 is closed.

An output voltage from lines 74 and 76 is provided by timer 70 on an output line 82 after the elapsed time period. Indicator lamp 66 connected between output line 82 and supply line 76 is lit when the time period of timer 70 elapses.

Indicating circuit 68 indicates initial presence of the hen on nesting assembly 10 and also indicates if such presence exceeds a predetermined duration of time. Initially, with no hen present on the nesting assembly, the electrical connection of sensor 50 is open. With the connection open, indicator lamps 64 and 66 are off and timer 70 is not running.

As stated earlier, when a hen is present on nesting assembly 10, the weight of the hen causes the electrical connection of sensor 50 to close, so indicator lamp 64 is turned on and timer 70 is initiated. Indicator lamp 64 remains on and timer 70 will run to the end of its preselected period if the hen remains on the nesting assembly to keep sensor 50 closed. If the hen vacates the nesting assembly before the preselected time duration of timer 70 has expired, sensor 50 returns to its open state, indicator lamp 64 turns off and timer 70 will reset in a conventional, known manner. However, if the hen remains on the nesting assembly for a duration longer than the preselected time duration set on timer 70, output line 82 then is connected to line 74 by an internal timer switch to turn on indicator lamp 66. Indicator lamp 66 signifies to the operator that the hen currently present on the corresponding nesting assembly has been there too long for normal egg laying and should be removed. Removal of the hen, whether forcibly or voluntarily, again restores indicating circuit 68 to its initial state with indicator lamps 64 and 66 off and timer 70 reset. As shown in FIG. 3, an optional test switch 88 may be provided to verify that indicator lamp 66 is functioning properly.

In summary, the present invention provides an improved nesting assembly that encourages domestic fowl egg production. Whether supported in the open or installed as a nesting bottom in a new or existing nesting enclosure, the nesting assembly provides vital nest status information. Intrusive indicators such as buzzers could be incorporated to provide this status information. However, the present invention preferably includes an adjustable timer coupled to non-intrusive indicator lamps. In the preferred embodiment, these indicator lamps are color coded so that the operator can quickly ascertain the present status of each nesting assembly without fear of disrupting the hen currently on the nesting assembly or discouraging other hens from entering a vacant nesting assembly. A green light is used to indicate hen occupancy and a red light used to indicate excessive time of occupancy.

Although the present invention has been described with reference to preferred embodiments, workers skilled in the art will recognize that changes may be made in form and detail without departing from the spirit and scope of the invention.

What is claimed is:

1. A nesting assembly for a domestic egg producing fowl, comprising:
   a support member;
   a fowl support plate mounted to the support member, the support plate forming a nesting basin; and
   a sensor mounted relative to the support member to sense presence of a fowl in the nesting basin and to provide an output signal to an electrical circuit when a fowl is present in the nesting basin.

2. The nesting assembly of claim 1 wherein the sensor comprises a switch having an "on" state and an "off" state electrically coupled to the circuit, the sensor output comprising a change in the state of the switch.

3. The nesting assembly of claim 2 wherein the circuit includes a sensor output indicator, the circuit initiating the sensor output indicator when the sensor provides an output signal.

4. The nesting assembly of claim 3 wherein the circuit further includes a timer, the circuit initiating the timer when the sensor provides an output signal, and the timer providing a timer output signal after a preselected duration of time of presence of a fowl on the nesting basin.

5. The assembly of claim 4 wherein the timer includes an adjustable preselected time duration and the circuit further includes a timer output indicator connected to provide an indication of time duration elapse.

6. The assembly of claim 5 wherein the sensor output and timer output indicators are lamps.

7. A nesting assembly for domestic fowl egg production, comprising:
   a support member;
   a fowl contact plate mounted to the support member, the contact plate having an upper surface with a depression thereon forming a nesting basin, the nesting basin having a lower basin wall;
   a sensor connected to a power supply, the sensor being actuated by weight of a fowl in the nesting basin; and
   an indicator lamp connected to the sensor to indicate presence of the fowl.

8. The assembly of claim 7 and a timer having an adjustable preselected time period connected to the sensor, the sensor initiating the timer from weight of the fowl, and the timer providing a signal indicating when the time period has elapsed.

9. The assembly of claim 8 wherein the sensor returns to an initial position when a fowl is not present thereon, and a second indicating lamp connected to an output of the timer, the timer initiating the second lamp after the time period, the timer being reset when the fowl vacates the nesting basin.

10. The assembly of claim 9 wherein the sensor comprises a switch mounted to the support member below the lower basin wall, the switch being actuated by downward deflection of the lower basin wall from weight of the fowl thereon.

11. The assembly of claim 9 wherein the sensor comprises a pressure sensitive mat.

12. A nesting assembly for encouraging domestic fowl egg production, comprising:
    a support member;
    a fowl contact plate mounted to the support member, the contact plate comprising an oval depression forming a generally conical wall nesting basin, the basin having an inclined lower basin wall sloping rearwardly to an aperture in a wall of the basin; and
    a sensor associated with the lower basin wall to provide an output signal to an electrical circuit when a fowl is present in the nesting basin.

13. The nesting assembly of claim 12 wherein the sensor is connected to a circuit that includes an indicating lamp, the circuit initiating the lamp when the sensor output is representative of the weight of the fowl.

14. The nesting assembly of claim 13 wherein the circuit further includes a timer, the circuit initiating the timer when the sensor output is representative of weight of the fowl and the timer timing a duration of time until the sensor output represents removal of fowl weight.

15. The assembly of claim 14 wherein the timer includes an adjustable preselected time duration and the circuit further includes a second indicating lamp connected to an output of the timer, the timer initiating the second lamp when the preselected time duration has been exceeded before removal of fowl weight.

16. The nesting assembly of claim 15 wherein the lower basin resiliently deflects from an initial position when the fowl is supported on the nesting basin, and wherein the sensor comprises a switch electrically coupled as an input to a circuit, the switch being located below the lower basin wall to detect downward deflection of the lower basin wall.

17. The assembly of claim 16 wherein the sensor comprises a pressure sensitive mat located on the lower basin wall.

18. A poultry nest timing circuit for use in combination with a poultry nest comprising:
    a timer;
    poultry detecting means adapted to be mounted on a nest and electrically coupled to an input of the timer, the poultry detecting means initiating the timer when a fowl is present on the nest;
    means for mounting said poultry detecting means to said nest;
    timer output indicator means electrically coupled to an output of the timer and initiated by a timer output signal, providing in indication of time duration elapse;
    means to couple the poultry nest timing circuit to an electrical power supply.

19. The poultry nest timing circuit of claim 18 wherein the circuit further comprises a timer start indicator electrically coupled to the poultry detecting means and initiated when a fowl is present on the nest.

20. The poultry nest timing circuit of claim 18 wherein the poultry detecting means comprises a weight sensitive switch.

21. A nesting assembly for encouraging domestic fowl egg production, comprising:
    a support member;
    a fowl contact plate mounted to the support member, the fowl contact plate defining a first plane and having an oval opening therein of size to receive the lower portion of a body of a nesting fowl;
    a generally conical wall extending downwardly from the fowl contact plate and joining an edge of the oval opening, the generally conical wall converging in downward direction;
    an inclined lower basin wall sloping rearwardly and downwardly and being supported by the conical wall; and
    an opening from the conical wall and lower basin wall at the rear of the basin.

* * * * *